United States Patent Office 3,305,922
Patented Feb. 28, 1967

3,305,922
METHOD FOR EXPLOSIVE WELDING AND
EXPLOSIVE WELDED PRODUCTS
Cornelis A. Verbraak, Delft, Petrus J. M. Boes, The Hague, Ervin G. Chirer, Delft, and Leo Visser and Arie Verkaik, Rotterdam, Netherlands, assignors to Nederlandse Organisatie voor Toegepast-Natuurwetenschappelijk Onderzoek ten behoeve van Nijverheid, Handel en Verkeer, The Hague, Netherlands
No Drawing. Filed Mar. 28, 1963, Ser. No. 268,577
Claims priority, application Netherlands, Apr. 10, 1962, 277,049
17 Claims. (Cl. 29—492)

The invention relates to a method for the explosive welding of metals, as the bonding of metal work pieces by fusion of their facing surfaces caused by the shock wave arising for instance from the explosion of an initiated charge at some distance from the work pieces, is called.

It is generally known that a number of metals can be bonded together by this explosive welding; for instance aluminium to carbon steel, aluminium to stainless steel, stainless steel to stainless steel, aluminium to aluminium, copper to aluminium.

However, it appears that the weld thus created proves to be unreliable under certain circumstances, especially under dynamic strains.

As has been shown by investigations made by the applicant, there is a frequent occurrence of intermetallic compounds of brittle character, whilst in the bonding zone a great many tiny cracks occur, which makes these welds unreliable.

It is the object of the invention to provide a method for explosive welding, which does not suffer from these disadvantages and which resides in the recognition that the weld between two base metals will only then be adequate if it is formed by an intermediate zone between said base metals, consisting of a continuous ductile zone of ductile mixed crystals. If desired another dispersed phase may be present inside these mixed crystals, but the ductile mixed crystals ought to form a continuous coherent layer reaching from one base metal to the other.

This recognition is realized if, according to the invention, prior to the explosive welding, at least one other intermediate metal, in the form of a powder-layer, a foil, a coating or the like, is provided on at least one of the surfaces to be welded of two work pieces of metal, the melting point of said intermediate metal being lower than the melting point of at least one of the work-piece metals, whilst this or these intermediate metal(s), under the conditions of this explosive welding form(s) ductile mixed crystals with at least one of the other metals, and the quantity of said intermediate metal(s) is so small that after the explosive welding the intermediate metal atoms are quantitatively recovered in the ductile mixed crystals only, which form a continuous coherent ductile zone between the work-piece base metals.

According to the invention it is to be recommended that at least one of the intermediate metals should be provided on that work piece base metal, which is situated opposite the metal with which the intermediate metal forms ductile mixed crystals.

If the base metals of the work pieces form intermetallic compounds, a quantity of intermediate metal should be used, which renders the formation of these compounds of the base metals mainly impossible. For this purpose a minimum layer thickness of the intermediate metal of about 5 microns is required.

In case two or more intermediate metals are used the minimum thickness of the first layer amounts to 2 microns. The total thickness of all layers being over 5 microns.

According to the invention, it is preferred to apply a quantity of intermediate metal never exceeding a layer thickness of 50 microns for each kind of metal prior to welding. Otherwise intermediate metal atoms may form coherent aggregates outside the ductile mixed crystals which is to avoid per se.

The really required layer thickness is dependent on the nature of the work piece metals, the thickness of the work pieces, more especially the thickness of the work piece at the side where the shock wave of the explosion first enters, and, naturally, on the energy and the impulse the explosion can supply at the welding site.

When welding together plates of a thickness of about 2 mm., resting on a flat, stable support a layer thickness of 20 microns will generally suffice, the thickness of a foil being considered as suitable. The intermediate metal can be applied on a base metal surface as a powder mixed with a binder, the application of a layer by chemical or electrical means such as galvanic coating, electroplating or vapour depositing not being excluded.

The thin layer of intermediate metal is preferably applied to that work piece metal having the lowest melting point, or to the work piece metal through which the shock wave reaches the welding site. However, in some cases the reverse is more desirable, because, in the first instance, the intermediate metal should form no mixed crystals with the work piece metal to which it was applied prior to welding.

The intermediate metals, which form ductile mixed crystals preferably with metals of components of most of the constructional metals, the composition of which is already generally known, can be derived from phase diagrams which are either known or to be composed. The required quantities of intermediate metal can be derived from said diagrams. A correction is simply found by judging a number of test weldings, such while having regard to the geometrical properties of the work pieces and the influence thereof on the charge to be used and on the size of the melting area in the weld.

The explosive welding of 2 mm. of Al sheet of commercial quality having 99.5% of Al to a 2 mm. stainless steel plate comprising 16.5–18.5% of Cr, 10.5–12.5% of Ni, 0.06% of Co, 2–2.5% of Mo, balance Fe, may serve as an example.

In known explosive welding technique, a bonding zone is created containing the intermetallic compound (NiFeCr)Al, the Al atoms being situated in the centre of the body centered cubic lattice and Ni, Fe and Cr atoms being statistically distributed over the corner points of the cube. This compound is very brittle and the bonding zone shows many tiny cracks, so that the weld is unreliable under dynamic load.

According to the invention, a layer of Cu powder having a thickness exceeding 5 microns and preferably of about 20 microns is applied to the Al sheet prior to welding. The shock wave is supplied by a sheet of 50 x 40 x 4 mm.$^3$ of pentrite as an explosive ignited with an initiator and passes through a rubber buffer into the aluminium sheet. The welding area is about 50 x 50 mm.$^2$ and the 2 mm. stainless steel plate rests on a steel support.

After welding, a continuous ductile zone of mixed crystals of Ni, Fe, Cr and Cu is present between the steel and the aluminium. The intermetallic compound (NiFeCr)Al is missing, probably because, notwithstanding the lower melting point, the Al atoms have not been able to reach the remaining atoms of the steel prior to the formation of the mixed crystals with the copper. It is not impossible that the copper should be expelled on front of the aluminium by means of the shock-wave front and together with the nickel out of the steel gives rise to a mixed crystal formation. Separate copper formations are entirely lacking and all the mixed crystals have substantially the same composition without segregation and diffusion phenomena.

Steel having a nickel content of less than 6% will still give rise to difficulties and for this reason, in addition to the copper layer on the aluminium, a nickel layer having a thickness exceeding 2 microns and preferably of about 15 microns for material and weld dimensions as beforementioned, is applied to the ferritic steel prior to welding.

It is essential that in both weldings no larger quantity of copper or of copper and nickel respectively should be introduced than are necessary for the formation of ductile mixed crystals. If more than that quantity is used, the excess of copper and nickel gives rise to the formation of aggregates of such a nature as to interrupt the coherence and the continuity of the ductile zone of the ductile mixed crystals.

However, it is only in a few test weldings that the exact quantity of intermediate metal can be determined by microscopic and röntgenographic examination, provided, of course, that explosion conditions are kept constant.

Explosive welding according to this invention can also be applied to two work pieces consisting of the same metals. This method will not only be adopted if explosive welding could give rise to brittle compounds between components of the work piece metals, but also if, owing to circumstances such as the wall thickness of the work pieces or the radius with tubes, the energy and the impulse of the shock wave at the welding site are not sufficient to obtain a satisfactory weld composition.

In this case a layer of intermediate metal is applied to one of the work piece surfaces, preferably to the one where the shock-wave front enters the welding to be made, which layer of intermediate metal meets the requirements as regards the formation of ductile mixed crystals at a lower temperature level and, therefore, needs less energy. As an example may be cited stainless steel containing more than 6% of nickel on stainless steel of the same composition having an intermediate layer of copper. An example of different type is austenitic stainless steel welded to ferritic steel a layer of copper being provided on the austenitic steel surface prior to welding. Here the intermediate copper prevents the formation of martensite.

If the steel itself is very hard and the copper would give mixed crystals which were too ductile, it is also possible to use manganese instead of copper as an intermediate metal on the work piece metal facing the steel, the manganese giving mixed crystals of greater hardness and of a composition containing up to about 50% of Mn—50% of stainless steel.

Besides the application of aluminium on stainless steel, which can be explosive-welded onto the aluminium with a single intermediate metal layer of copper, and of aluminium on a steel containing less than 6% of Ni, which in addition to the copper layer obtains a layer of nickel on the steel, the application of brass on austenitic stainless steel can be quoted as an example of applying the intermediate metal layer in a different way. Both if α brass or β brass is used a copper layer is applied to the steel prior to welding, because in this case the copper is, together with the brass going to form the ductile mixed crystals, which in both instances are of the α brass type.

In welding aluminium to steel or copper plate a zinc layer applied to the aluminium can also be used. This gives the advantage, that less energy is needed, because the melting point of zinc is lower than that of copper. Also, a layer of zinc can be applied to the aluminium and to said zinc layer a layer of copper prior to the explosive welding to a non-copper work piece.

In the explosive welding of metals or metal compounds, such as carbides and the like and other metals not having the same lattice structures, two intermediate metals must be applied. When welding a niobium work piece onto an aluminium work piece, a copper layer is applied to the aluminium and a nickel layer to the niobium. Welding a hard metal onto steel requires a copper layer on the steel and a nickel layer on the hard metal. However, in such, mostly small, welds the utmost care should be given to the positioning and the quantity of the charge as also to the distance and the buffering between the work pieces and the charge.

For instance, when applying refinable aluminium alloys to steel using intermediate layers of copper and nickel, these aluminium alloys can be improved after the explosive welding, because the weld consisting of ductile mixed crystals is not affected by a later treatment which is effected at a considerably lower temperature.

Although copper and nickel are the preferred intermediate metals, a single intermediate metal layer of copper, if feasible, being simplest there are other intermediate metals which are not unimportant either. It is a matter of bringing economy and the special requirements into correlation, because these expensive intermediate layers are appropriate only when welding together metals having high to extremely high melting points.

Besides nickel-copper, copper-zinc and iron-manganese, for instance gold-palladium, silver-gold, silver-palladium, nickel-gold and gold-platinum are also applicable.

In all cases the layers of intermediate metal should be applied in such a way that, when welding, two metals which are to form the mixed crystals, are each positioned on a different side, i.e. one metal, preferably the one having the lower melting point, must be present on the surface through which the shock wave approaches the welding site, and the other metal, having the higher melting point, must be present on the surface which, so to speak, lies still and receives the shock wave. Welding seems to be the result of the friction between these surfaces, which during the passage of the shock wave move with respect to one another and consequently melt. The metals immediately turn solid again in the mixed-crystals forms, the extremely short time precluding any chance of diffusion or segregation.

We claim:
1. A method for the explosive welding of metal work pieces comprising the steps of:
arranging metal work pieces so as to have opposing surfaces at which a welded joint is to be formed;
applying a layer of explosive to one of said work pieces;
applying at least one substantially continuous layer of at least one intermediate metal to at least one of the surfaces at which the joint is to be formed, the melting point of the intermediate metal being lower than the melting point of at least one of the metal work pieces; and
initiating said explosive so that detonation is propagated through said work piece having said explosive applied thereto so as to form a welded joint between said metal work pieces in the form of a continuous coherent ductile zone of mixed crystals with the layer of intermediate metal being of such thickness that after the explosive welding the intermediate metal atoms are quantitatively present only in this ductile zone.

2. The method as defined in claim 1 wherein one layer of an intermediate metal is applied such that by explosive welding the mixed crystal zone is formed by the intermediate metal and at least one of the work pieces.

3. The method as defined in claim 2 wherein said layer of an intermediate metal is applied to one work piece so that by explosive welding the mixed crystal zone is formed by the intermediate metal and the other work piece.

4. The method as defined in claim 1 wherein layers of different intermediate metals are applied such that by explosive welding the mixed crystal zone is formed by the intermediate metals.

5. The method as defined in claim 1 wherein said layer of intermediate metal is applied to the surface of the work piece through which the detonation approaches the joint to be welded.

6. The method as defined in claim 1 wherein the thickness of each layer of an intermediate metal prior to welding is between 2 microns and 50 microns.

7. The method as defined in claim 1 wherein the thickness of a layer of a single intermediate metal prior to welding is greater than 5 microns.

8. The method as defined in claim 1 wherein the work pieces are constituted by a substantially aluminum work piece and an austenitic steel work piece, and said intermediate metal is constituted by copper which is applied to the surface of the substantially aluminum work piece.

9. The method as defined in claim 1 wherein the work pieces are constituted by a substantially aluminum work piece and a work piece of steel having less than 6% nickel content, and said at least one layer of at least one intermediate metal is constituted by a layer of nickel which is applied to the steel work piece and by a layer of copper which is applied to the substantially aluminum work piece.

10. The method as defined in claim 1 wherein one of said work pieces is constituted by aluminum and the other work piece is constituted by a different metal, and said intermediate metal is constituted by zinc which is applied to the aluminum work piece.

11. The method as defined in claim 1 wherein one of said work pieces is constituted by aluminum and the other work piece is constituted by steel, said at least one layer of at least one intermediate metal including a layer of zinc which is applied to said aluminum work piece and a layer of copper which is applied to said first layer.

12. The method as defined in claim 1 wherein one of said work pieces is constituted by brass and the other work piece is constituted by steel, and said intermediate metal is constituted by steel, and said intermediate metal is constituted by copper which is applied to said steel work piece.

13. The method as defined in claim 1 wherein one of said work pieces is constituted by steel and the other work piece is constituted by a different metal, said intermediate metal being constituted by manganese which is applied to the surface of the other work piece.

14. The method as defined in claim 1 wherein each of said work pieces is constituted by stainless steel having a greater than 6% nickel content, and said intermediate metal is constituted by copper which is applied to one of said work pieces.

15. The method as defined in claim 14 wherein said intermediate metals are selected from the group consisting of gold, silver, platinum, palladium, nickel, manganese, copper, iron, zinc, and aluminum.

16. The method as defined in claim 1 wherein said work pieces are constituted by metals having different lattice structures and two different intermediate metals are applied, each of said intermediate metals differing from the material of said work pieces.

17. The method as defined in claim 1 wherein said at least one layer of at least one intermediate metal is in the form of a powder, a foil, or a coating.

References Cited by the Examiner

UNITED STATES PATENTS

| | | |
|---|---|---|
| 2,790,656 | 4/1957 | Cook. |
| 3,015,885 | 1/1962 | McEuen et al. _____ 29—497.5 X |
| 3,060,557 | 10/1962 | Rostoker et al. _____ 29—194 |
| 3,121,948 | 2/1964 | Hollander et al. _____ 29—470.3 |
| 3,137,937 | 6/1964 | Cowan et al. _____ 29—497.5 X |
| 3,194,643 | 7/1965 | Ma et al. _____ 29—470.1 X |

JOHN F. CAMPBELL, *Primary Examiner.*

PO-1050
(5/69)

UNITED STATES PATENT OFFICE
CERTIFICATE OF CORRECTION

Patent No. 3,305,922          Dated February 28th, 1967

Inventor(s) Cornelis Antonius Verbraak et al

It is certified that error appears in the above-identified patent and that said Letters Patent are hereby corrected as shown below:

Column 5, lines 34-35, cancel "and said intermediate metal is constituted by steel". (Original claim 29, lines 3-4).

Column 6, line 13, change "14" to --16--. (Original claim 33, line 1).

Signed and Sealed this twenty-third Day of September 1975

[SEAL]

Attest:

RUTH C. MASON
*Attesting Officer*

C. MARSHALL DANN
*Commissioner of Patents and Trademarks*